United States Patent
Balasubramanian et al.

(10) Patent No.: US 6,195,456 B1
(45) Date of Patent: Feb. 27, 2001

(54) MULTI RESOLUTION COLOR CORRECTION USING WAVELET TRANSFORMS

(75) Inventors: Thyagarajan Balasubramanian, Webster; Ricardo L. de Queiroz, Fairport, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/770,768

(22) Filed: Dec. 19, 1996

(51) Int. Cl.[7] ............................. G06K 9/00; G06K 9/36; G06K 9/46; G03F 3/08
(52) U.S. Cl. ..................... 382/167; 382/162; 382/166; 382/240; 382/248; 358/518
(58) Field of Search ...................... 382/162, 166, 382/167, 232, 233, 248, 240, 299, 298; 358/1.9, 1.15, 518, 539, 540, 432; 345/153, 428; 348/397, 398, 399, 400

(56) References Cited

U.S. PATENT DOCUMENTS 5,666,475 * 9/1997 Salesin et al. ........................ 345/428

* cited by examiner

*Primary Examiner*—Leo Boudreau
*Assistant Examiner*—Dmitry A. Novik
(74) *Attorney, Agent, or Firm*—Robert Cunha

(57) ABSTRACT

Color printing systems frequently use multiresolution analysis, which creates intermediate lower resolution images, in applications such as descreening and filtering. The typical steps are to decompose the original image into sub bands, apply the application to one or more sub bands and then recompose the image, prior to color correction and color space transformation. This disclosure describes applying the color correction to one of the lower resolution sub bands and a simpler color space transformation to the final image as a way to reduce the amount of computation. The described multiresolution analysis is a wavelet transform.

16 Claims, 3 Drawing Sheets

MULTI RESOLUTION COLOR CORRECTION USING WAVELET TRANSFORMS

BACKGROUND OF THE INVENTION

There are a number of processes that may be applied to an image such as descreening, compression, segmentation, etc, which use multiresolution analysis. In this case, the image is divided into a number of frequency sub-bands, the process is applied to some of the sub-bands, and the sub-bands are recombined to form the processed image.

For color images, the problem is that running all of these processes for each color separation, along with other color conversions, results in a large amount of computational overhead. A method of reducing the amount of computation is needed.

An improved color image printing method is proposed for combining the aforementioned multiresolution representation of an image with the color conversions required for high quality printing. This is achieved by dividing the color conversion into two steps: a computationally complex 3-dimensional printer color correction step, applied to a lower resolution sub image; and a computationally simpler color space transformation step, comprising primarily 1-D functions, applied to the full resolution image. The computational cost is thereby reduced by applying the more difficult computation, color correction, to the sub image which has fewer image points.

SUMMARY OF THE INVENTION

The color conversions normally required to translate images from a device independent color representation to a printer specific representation can be divided into two steps. Color space transformations (device RGB to device CMYK) are relatively simple transformations, and can be done by mostly 1-D table lookups, and a small number of operations. In contrast, color correction from a device independent specification, R'G'B', to a set of device values, RGB that must be used for the specific printer to produce the desired colors, is a relatively computationally intensive process involving 3-D table lookups and interpolation. Thus, while the simpler 1-D color space transformations can be applied to the final full-resolution image, it would be an advantage if the computations in the 3-D color correction step could be reduced. The proposed solution is to apply the 3-D color correction to the much smaller number of pixels that already exist in a lower resolution image that is produced in the multiresolution analysis process. It has been determined that applying the color correction at a lower resolution results in a small loss of image quality that is not readily discernible in the final image while the amount of computation is significantly decreased.

One particular method of reducing the resolution of the image that is particularly suited to this use is wavelet transformation. In this process the image is passed through a number of filter stages, each of which separates the input into four bands. Each stage sends the lowest frequency band to the input of the next stage and outputs the other three bands as intermediate images. Color correction is applied to one or more of the lowest frequency bands, which have the lowest resolutions. Finally, all of the bands are recombined to a higher resolution image which now contains the color correction. The system is optimized by determining the lowest resolution to which the color correction can be applied with acceptable results.

DETAILED DESCRIPTION OF THE INVENTION

Figure 1:
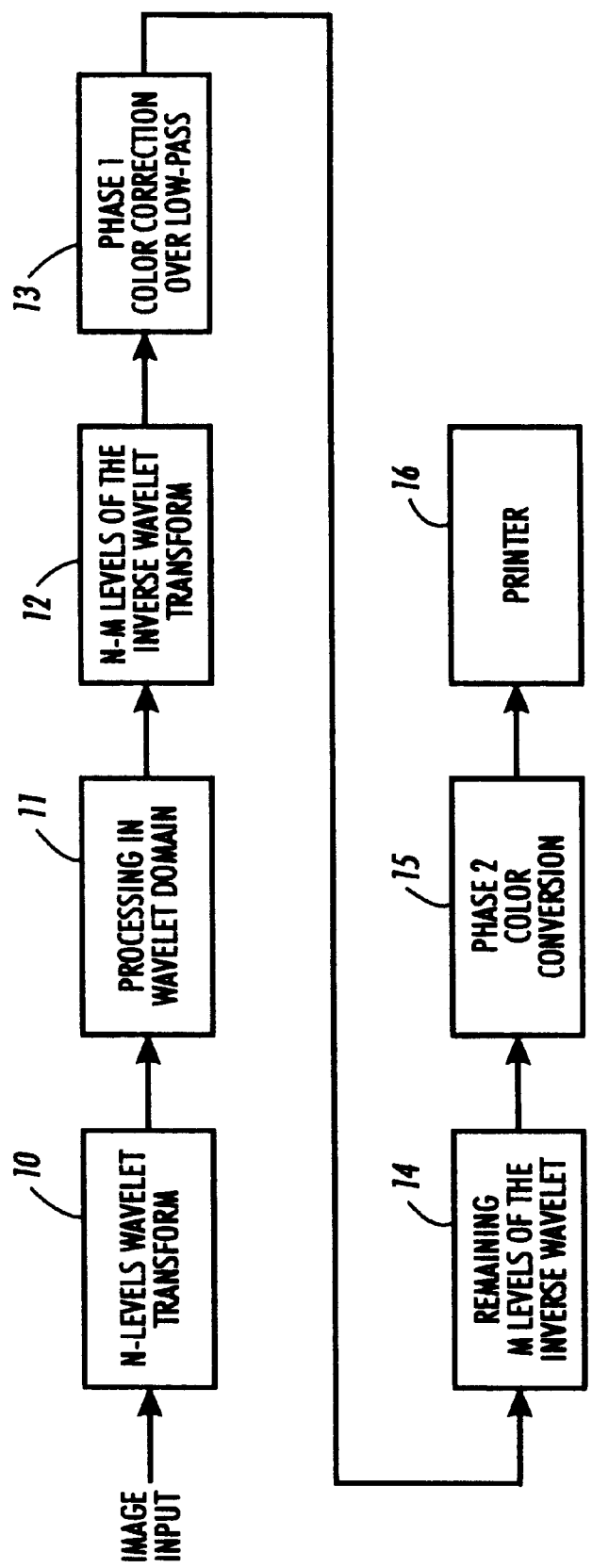
FIG. 1 is a block diagram of the disclosed method.

Multiresolution analysis is a tool in many areas of image processing, including segmentation, filtering, descreening and compression. The general model is that 1) the image is decomposed into a family of representations at different spatial resolution; 2) application dependent processing is carried out on one or more of these representations; and 3) the output image is synthesized from the representations. This discussion assumes that multiresolution is being used for a given application, (e.g., compression, descreening) and that the data also requires color translations from some device independent representation to device dependent coordinates.

For our purposes, the required color conversions may be divided into two steps. The first step, color correction, is a 3-to-3 function which translates image data from a device independent, or visually based, representation of color to a printer specific representation of color. For our purposes, the input triplet and output triplet of this function are assumed to have the same approximate sense and orientation. For example, if the input image is specified in an RGB space, representing the red, green, and blue responses of the average human observer; then the output of the color correction function would also be an RGB space, where here, R, G, B may represent the red, green, and blue reflectances of the printer cyan, magenta, and yellow colorants, respectively. Due to the highly nonlinear and interactive nature of most printer colorants, the color correction is usually a complex function, and is usually implemented by a 3-D lookup table (LUT). This function is pre-computed on a grid of nodes that constitute the LUT. The value of the color correction for an arbitrary input color, C, is then approximated by some form of interpolation among the values at the nodes in the immediate vicinity of C. The 3-D lookup and interpolation requires several multiplication, addition, shift, and lookup operations for each image pixel.

The second step, color space transformation, maps the printer specific triplet produced in the first step to cyan, magenta, yellow, and black (CMYK) signals to be sent to the printer. This involves the following sequence of operations: a) a simple 3-to-3 function mapping the RGB output of the color correction function to CMY; b) an undercolor removal (UCR) or gray component replacement (GCR) function mapping CMY to CMYK; and c) a set of tone reproduction curves (TRC's) that individually calibrate or linearize each of the C, M, Y, K responses. Part (a) simply serves to change the sense of the 3-D color space to CMY. For example, if the output coordinates of the color correction are printer RGB, then we would change this to CMY orientation by letting C=1−R; M=1−G; Y=1−B. Part (b) utilizes any reasonable UCR/GCR method to convert CMY to CMYK; many techniques are well known in the art. The idea is to add K for better tone reproduction and gamut in the dark regions; and to possibly compensate for this K addition by reducing the amounts of C, M, Y. Finally, part (c) may be derived from standard calibration procedures well known in the art. Many of the operations in these 3 parts can be combined, yielding a color transformation that is relatively computationally simple in comparison to the color correction. We also note in an alternate embodiment, there may be no need to perform all of the operations in the color space transformation. As an example, some printers employ only 3 inks, C, M, Y, in which case there is no need to perform UCR/GCR. As another example, some printers internally perform their own UCR/GCR and tone reproduction. This is compatible with the proposed architecture. The key idea behind the invention is that the first step of color correction is performed on a low resolution version of the image.

Numerous methods exist to decompose images into multiple resolutions. The wavelet transform is used here as an example of a multiresolution technique, as this is a general framework that is used in applications such as descreening and compression The wavelet transform, assumed to operate independently on each of the three color separations, is applied with the use of a cascade of filter banks. These filter banks are composed of low- and high-pass filters. At a given level the image is split into a plurality of sub bands. The subband with the lowest frequency band of the input image is used as the input to the next stage. After the separation into sub bands is complete, the image is processed by the application and color correction is performed in the wavelet domain. Finally, an inverse wavelet transform is used to reconstruct the image pixels.

The entire process is shown in FIG. 1 where it is assumed that N levels of decomposition are needed for the application, but that color correction may be applied at some intermediate level. In block 10 the image is decomposed into N levels of sub bands. The application processing is applied in the wavelet domain in block 11. The inverse transform is used to compose the image to an intermediate N-M level at block 12 and color correction is applied to one or more sub bands at block 13. The resultant sub bands are now composed back to the image level at block 14 and the final color processes are applied.

In this preferred embodiment, the color image separations are decomposed into different frequency subband images using the discrete wavelet transform. The discrete wavelet transform and its inverse transform are fully described in *Wavelets and Subband Coding* by M. Vetterli and J. Kovacevic, Prentice Hall PTR (1995); *Wavelets and Filter Banks* by G. Strang and T. Nguyen, Wellesley-Cambridge Press (1996); and *Wavelet Basics* by Y. T. Chan, Kluwer Academic Publishers (1995), each incorporated herein by reference. The discrete wavelet transform is used because the processing stage, being compression, descreening, or the like, can be done more efficiently in the resulting subband images. While the edges and texture information reside primarily in the high frequency subband images, the subband images with low frequency and at coarse resolutions contain most of the signal energy.

Figure 2:
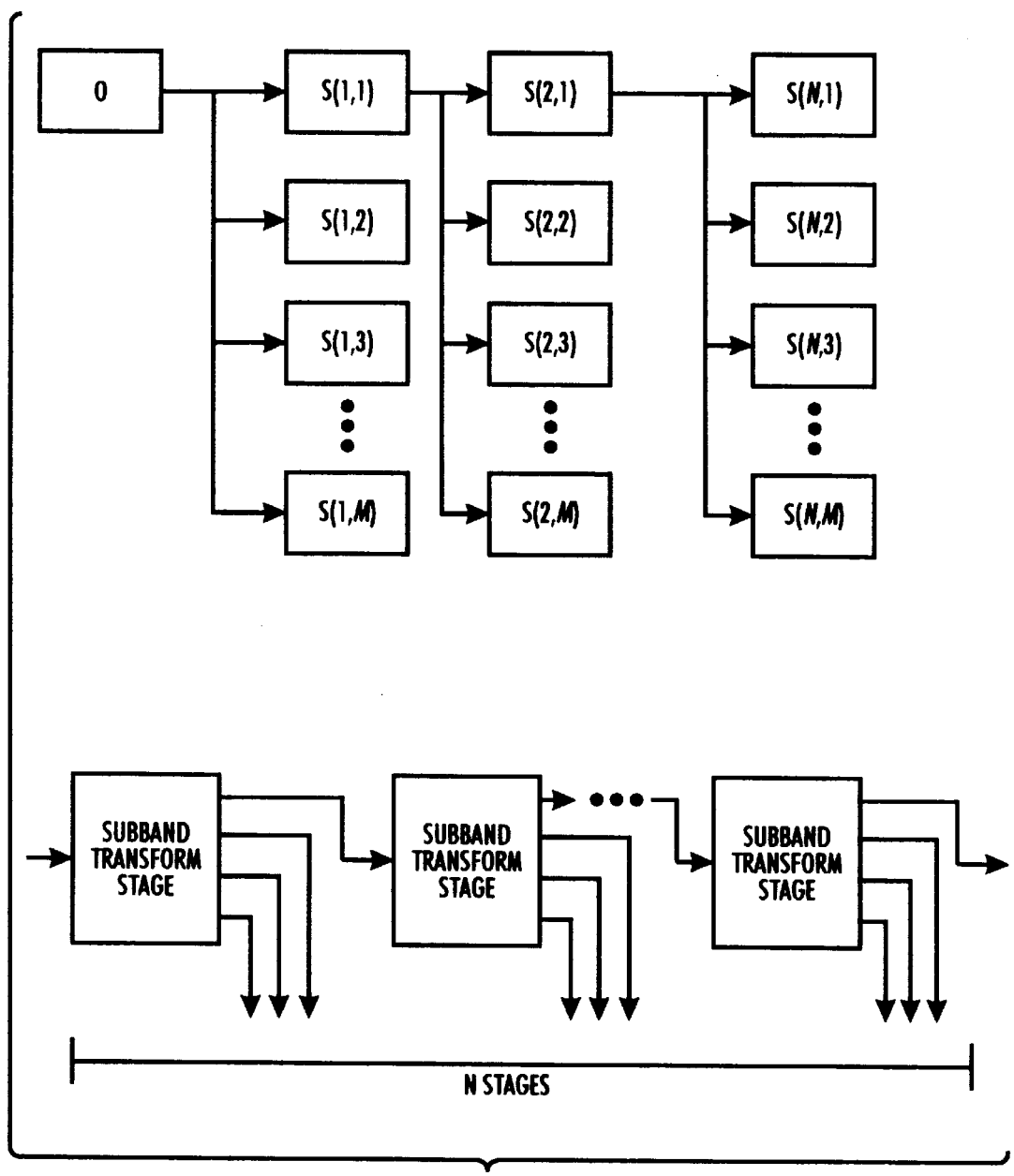
FIG. 2 illustrates the general subband decomposition and its hierarchical implementation.

Subband and wavelet transformation will be explained in more detail below. In a more general subband transformation, illustrated in FIG. 2, the original image O is decomposed into a plurality of sub images S(1,n), for n=1 . . . M. These images are referred to as subbands and have different orientations, frequency contents, and resolutions. Subband transformations are often implemented hierarchically where one of the resulting subbands at a given stage is used as input to another subband transformation. Without loss of generality we can use S(1,1) as an input to another subband transformation stage generating subbands S(2,n). The process can be repeated several times. The only constraint we pose on the decomposition process is that at any decomposition stage, the resulting subbands are a basis for the reconstruction or accurate approximation of the input image. In other words, given the subbands there must be an inverse subband transformation able to reconstruct the input image from the set of subbands.

Figure 3:
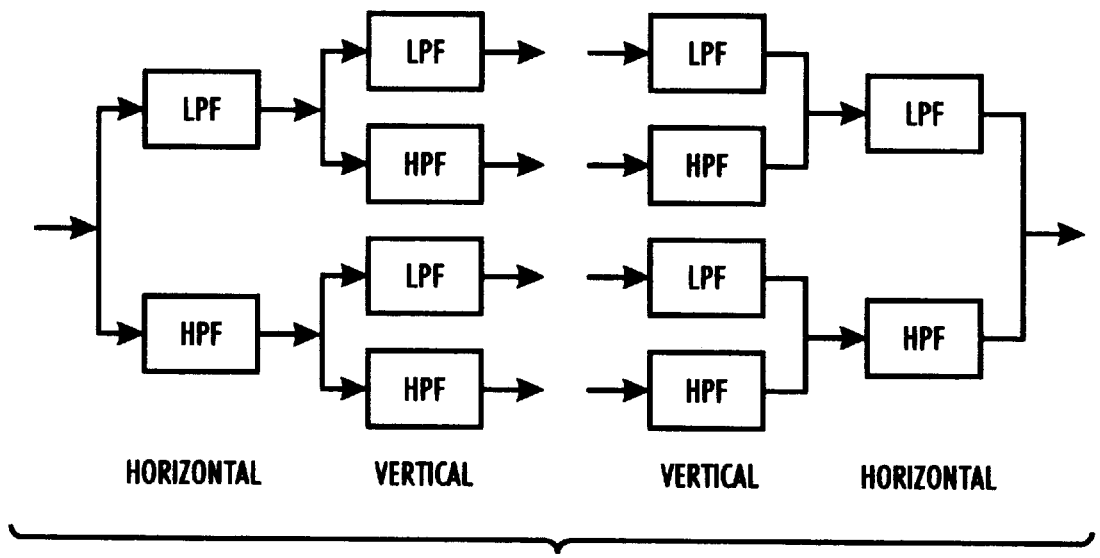
FIG. 3 is a description of the low- and high-pass filtering approach used in each stage of the preferred embodiment of the discrete wavelet transform.
Figure 4:
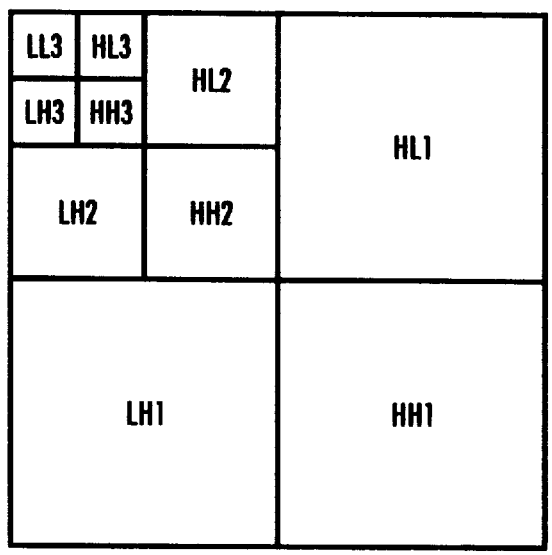
FIG. 4 illustrates the decomposition of an image into quadtree organized subbands via the discrete wavelet transform.

A separable wavelet transform is a particularization of the subband transformation. By using separate filter banks illustrated in FIG. 3, containing special high- and low-pass filters, an image is decomposed into 4 subbands, by low- and high-pass filtering the image, sequentially, in both directions. The signal is subsampled after each filter, so that each subband contains one quarter of the pixels of the input image. Three subbands contain high-frequency information in different orientations: vertical (LH), horizontal (HL), and diagonal (HH). The remaining subband (LL) contains low-pass information. Like the hierarchical implementation of the subband transformation, the low-pass subband LL is used as input to another decomposition stage. Therefore, 7 subband images result from the process. Three high-pass subbands from the first stage, three high-pass subbands from the second stage and a low-pass subband image. In an N-stage decomposition, illustrated in FIG. 4, the original image O is decomposed into a quadtree of subbands of diminishing resolutions. Image O is first decomposed into subbands $HL_1$, $LH_1$, $HH_1$, and $LL_1$. Image $LL_1$ is decomposed into $HL_2$, $LH_2$, $HH_2$ and $LL_2$. After N stages we are left with subbands $HH_1$ through $HH_N$, $HL_1$ through $HL_N$, and $LH_1$ through $LH_N$. There is also the subband at the coarsest resolution level $LL_N$, amounting to 3N+1 subbands. As N increases, the resolution of the coarse level low-pass image $LL_N$ decreases.

Similarly, the N-stage subband decomposed image can be recombined to reconstruct or approximate closely the original image. The subbands $HH_N$, $HL_N$, $LH_N$, and $LL_N$ are upsampled, filtered, and added to recompose image $LL_{N-1}$. In the next stage, subbands $HH_{N-1}$, $HL_{N-1}$, $LH_{N-1}$, and $LL_{N-1}$ are used to recompose subband $HH_{N-2}$. The process is repeated until $LL_1$ is obtained so that $HH_1$, $HL_1$, $LH_1$, and $LL_1$ are used to reconstruct O.

After the image is decomposed into subbands it is processed. Examples are descreening and compression. In descreening, the input image is a halftone and the subbands are selectively filtered in such a way as to remove the halftone artifacts while maintaining important high-frequency details of the image. After the subband images are filtered they are recombined to form a continuous tone image, in which the halftone patterns are removed. In compression applications the wavelet coefficients are quantized and encoded using variable length codes. The coded image is then transmitted or stored. Subsequently, a decoder decodes the data, dequantizes the coefficients and performs an inverse wavelet transform to recompose the image.

In the scope of the present invention, the image is transformed using a N-stage subband transform for any application oriented type of processing. The subbands are to be recombined into a color image which is to be printed. The straightforward processing steps are to perform the full N-stage inverse wavelet transform and, then, to apply color correction and conversion to all reconstructed pixels. As it is clear from an earlier discussion and for those skilled in the art, the color correction process can be divided into two steps, one for color correction and the other for color conversion.

In the present invention, after the subbands are processed, we use subbands at stage N-K+1 through those at stage N to reconstruct subband S(N-K,1) using only K stages of an inverse subband transform. The color correction is applied only to samples of the subband image S(N-K,1), obtaining the subband S'(N-K,1). In the next step, subband'(N-K,1), along with subbands S(u,v), for u=1, . . . , N-K-1, v=2, . . . , M, are used to reconstruct image P using N-K stages of the inverse subband transform. The samples in the resulting image P are, then, color converted to the desired color space through simple color conversion methods, therefore, obtaining image Q.

Image Q is ready to be printed, while the computation was largely reduced, since the color correction processing was only applied to a reduced number of pixels.

In the preferred embodiment of the proposed invention, the image is decomposed using N stages of the wavelet transform. The subbands are then processed according to the relevant application. Subbands $LL_N$, $HH_N$ through $HH_{N-K+1}$, $LH_N$ through $LH_{N-K+1}$, and $HL_N$ through $HL_{N-K+1}$, are used to reconstruct subband $LL_{N-K}$ via K stages of an inverse wavelet transform. Samples in subband $LL_{N-K}$ are color corrected obtaining subband $LL'_{N-K}$ which, along with subbands $HH_n$, $HL_n$, $LH_n$, for n=1, . . . , N-K, is input to N-K stages of the inverse wavelet transform in order to reconstruct the full resolution image P. The pixels of the resulting image P are, then, color converted to the desired color space obtaining image Q, which is ready to be printed.

The computational savings are more clear in this example, since the original image O has $2^{N-K} \times 2^{N-K}$ times more samples than the subband image $LL_{N-K}$. Hence, large savings are obtained in the color correction process. Tests reveal that quality is not sacrificed for reasonable values of N-K.

Wavelet based processing is used as a basis for this invention, but the claimed method is not limited to the discrete wavelet transform. Rather, cosine transforms (including the discrete cosine transform), lapped transforms, Fourier transforms, and the like, can be used in the color correction and conversion methods of this invention.

While this invention has been described in conjunction with the specific embodiments outline above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A color image rendering method in which the image is represented as a plurality of subbands, one subband of which has less resolution, the improvement comprising the steps of:

applying color correction to only the subband having less resolution; and inverting subband representation of the image by combining the color corrected subband with at least one of the other uncorrected subbands resulting in a color corrected image.

2. The method of claim 1 further comprising the step of applying color space transformation to the image after the inverting step.

3. The method in claim 1 wherein said image representation is achieved through wavelet transformation.

4. The method of claim 2 further comprising the step of applying tone reproduction curve correction after applying the color space transformation step.

5. The method of claim 2 wherein the color correction is performed by look up table and interpolation.

6. The method in claim 1 wherein the color correction is applied between device independent color space and printer color space.

7. The method in claim 1 wherein the color correction is applied between scanner color space and device independent color space.

8. The method in claim 1 wherein the color correction is applied between scanner color space and printer color space.

9. The method in claim 1 further comprising the step of printing the color corrected image.

10. A color image rendering method comprising:

separating the image into a plurality of subbands, one subband of which has less resolution;

applying color correction to only the subband having less resolution; and inverting subband representation of the image by combining the color corrected subband with at least one of the other uncorrected subbands resulting in a color corrected image.

11. A color image rendering method in which the image is represented as a plurality of subbands derived from a wavelet transformation, one subband of which has less resolution, the improvement comprising the steps of:

applying a color correction to only the subband having less resolution;

inverting the wavelet transformation of the image by combining the color corrected subband with at least one of the other uncorrected subbands resulting in a color corrected image;

applying color space transformation; and printing the color corrected image.

12. The method of claim 11 wherein the color correction is performed by look up table and interpolation.

13. The method of claim 12 further comprising the step of applying tone reproduction curve correction after applying the color space transformation step.

14. The method in claim 11 wherein the color correction is applied between device independent color space and printer color space.

15. The method in claim 11 wherein the color correction is applied between input device color space and device independent color space.

16. The method in claim 11 wherein the color correction is applied between input device color space and printer color space.

* * * * *